(12) United States Patent
Gruschko et al.

(10) Patent No.: US 10,402,387 B2
(45) Date of Patent: Sep. 3, 2019

(54) MECHANISM FOR CONSTANT-SPACE INDEXING OPTIMIZED DATA BLOCK MERGING

(71) Applicant: SAP SE, Walldorf (DE)

(72) Inventors: Boris Gruschko, Heidelberg (DE); Christian Mohr, Heidelberg (DE); Martin Strenge, Berlin (DE); Florian Foebel, Buerstadt (DE); Bjoern Friedmann, Rheinmuenster (DE)

(73) Assignee: SAP SE, Walldorf (DE)

( * ) Notice: Subject to any disclaimer, the term of this patent is extended or adjusted under 35 U.S.C. 154(b) by 231 days.

(21) Appl. No.: 15/377,375

(22) Filed: Dec. 13, 2016

(65) Prior Publication Data
US 2018/0165315 A1    Jun. 14, 2018

(51) Int. Cl.
*G06F 17/00* (2019.01)
*G06F 16/22* (2019.01)

(52) U.S. Cl.
CPC ................ *G06F 16/2282* (2019.01)

(58) Field of Classification Search
CPC .................................. G06F 17/30339
See application file for complete search history.

(56) References Cited

U.S. PATENT DOCUMENTS

| 5,546,575 | A | * | 8/1996 | Potter | G06F 16/284 |
| 6,009,432 | A | * | 12/1999 | Tarin | G06F 16/283 |
| 2009/0228430 | A1 | * | 9/2009 | Berger | G06F 16/283 |
| 2011/0040795 | A1 | * | 2/2011 | Gordon | G06F 3/0607 |
| | | | | | 707/792 |

FOREIGN PATENT DOCUMENTS

EP     3173942 A1 *   5/2017

* cited by examiner

*Primary Examiner* — Apu M Mofiz
*Assistant Examiner* — Farhad Agharahimi
(74) *Attorney, Agent, or Firm* — Mintz Levin Cohn Ferris Glovsky and Popeo, P.C.

(57) ABSTRACT

In one aspect, a computer-implemented method includes calculating cardinality differences and combined sizes for one or more data block pairs in a relational database. The method also includes selecting a data block pair from the one or more data block pairs based on a calculated cardinality difference and a calculated combined size associated with the selected data block pair. The method further includes merging the selected data block pair to form a merged data block, and replacing the selected data block pair in the relational database by the merged data block.

21 Claims, 7 Drawing Sheets

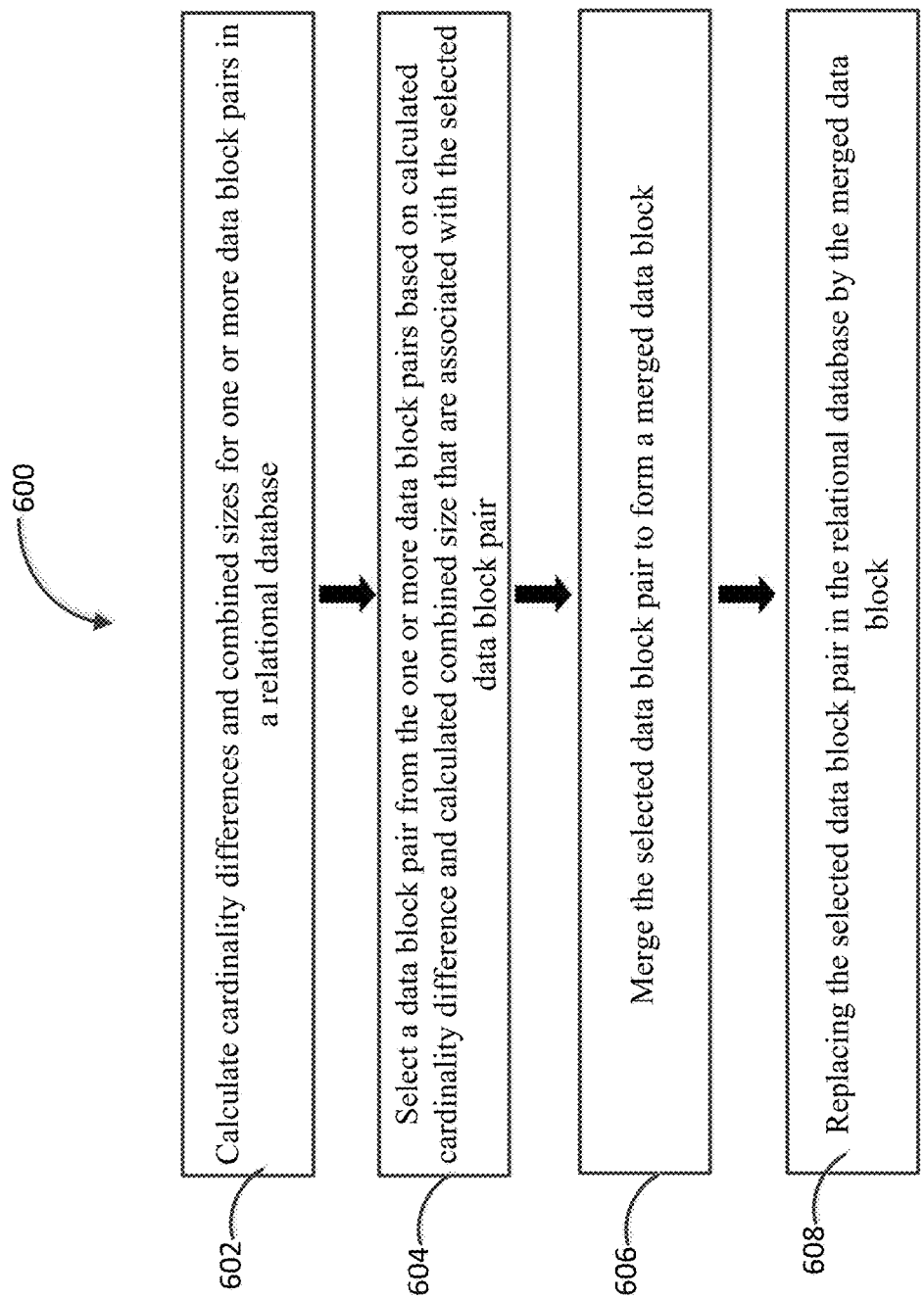

MECHANISM FOR CONSTANT-SPACE INDEXING OPTIMIZED DATA BLOCK MERGING

TECHNICAL FIELD

The subject matter described herein relates generally to databases having constant-space indexing for relational tables.

BACKGROUND

A database management system (DBMS) generally includes computer hardware running system software for creating and managing databases. Some examples of a DBMS include MySQL, PostgreSQL, MongoDB, Microsoft SQL Server, Oracle, Sybase, SAP HANA, and IBM DB2. The DBMS provides users and programmers with a systematic way to create, retrieve update and manage data in a database. Examples of databases include relational database, flat database, object oriented database, hierarchical database etc.

Data in a relational database of a DBMS can be stored in relational tables. In a relational table, data is organized into one or more tables comprising rows (also referred to as records or tuples) and columns (also referred to as attributes). A row of the relational table can represent a type of entity, and a column can represent values corresponding to the type of entity. Data in the relational table (e.g., values in a column) can be organized in data blocks. Each time a user requests access to a data block in the table, the DBMS can sequentially search the entire table. However, sequential searches can be inefficient, especially when the database is stored in a storage disk that is slow to respond to a search request (query).

Data in a database (e.g., a data block) can be efficiently accessed by using a data index. The data index can include a copy of a selected column of the relational table along with the memory address of data blocks in the selected column. When a user requests access to a data block, a search is performed in the data index. If a match is found, the DBMS can directly access the data block in the database. Hence, data index obviates sequential searching in the database, and can therefore allow accessing data efficiently.

SUMMARY

In one aspect, a computer-implemented method includes calculating cardinality differences and combined sizes for one or more data block pairs in a relational database. The method also includes selecting a data block pair from the one or more data block pairs based on a calculated cardinality difference and a calculated combined size associated with the selected data block pair. The method further includes merging the selected data block pair to form a merged data block, and replacing the selected data block pair in the relational database by the merged data block.

In some variations one or more of the following can optionally be included. In one aspect, the one or more data block pairs are in a column of the relational database.

In another aspect, the data block pair is selected by a sliding window, the sliding window selects adjacent data blocks in the column of the database.

In yet another aspect, the cardinality difference for a first data block pair from the one or more data block pairs is calculated by calculating a combined cardinality for the first data block pair, calculating a first cardinality for a first data block in the first data block pair and a second cardinality for a second data block in the first data block pair, and subtracting a larger of the first cardinality and the second cardinality from the combined cardinality.

In another aspect, the data block pair is selected when the calculated cardinality difference parameter associated with the data block pair is below a threshold value.

In another aspect, the computer implemented method includes a data index. The data index includes a sub-index assigned to the merged data block. The size of the sub-index is related to a cardinality of the merged data block.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 6 is a process flow diagram illustration an exemplary technique for merging data blocks in a column of a relational database.

DETAILED DESCRIPTION

There is a need for creating a faster and more efficient way to access data stored in a database. A data index can allow a user to access data stored in a database (e.g. relational table), based on a query from the user, without sequentially searching the entire database. However, for large relational tables, the corresponding data index can become very large. This problem can be obviated, for example, by using a constant-space index (e.g., bloom filters) whose size does not change. This ensures that even when the size of the relational table increases—for example, due to the addition of a new row—the size of the constant-space index is limited by a predetermined value. However, if the size of the relational table increases for a given constant-space index, the false positive rate (FPR) for user queries may increase. The FPR is indicative of the probability of a false positive match for a user request. It can be reduced, for example, by rearranging data in the relational table to improve the efficiency of the constant-space index. For example, the FPR can be reduced by merging one or more data blocks in a column of the relational table. The current disclosure relates to various approaches for merging data blocks to improve the performance of the constant-space index (e.g., by reducing FPR).

Figure 1:
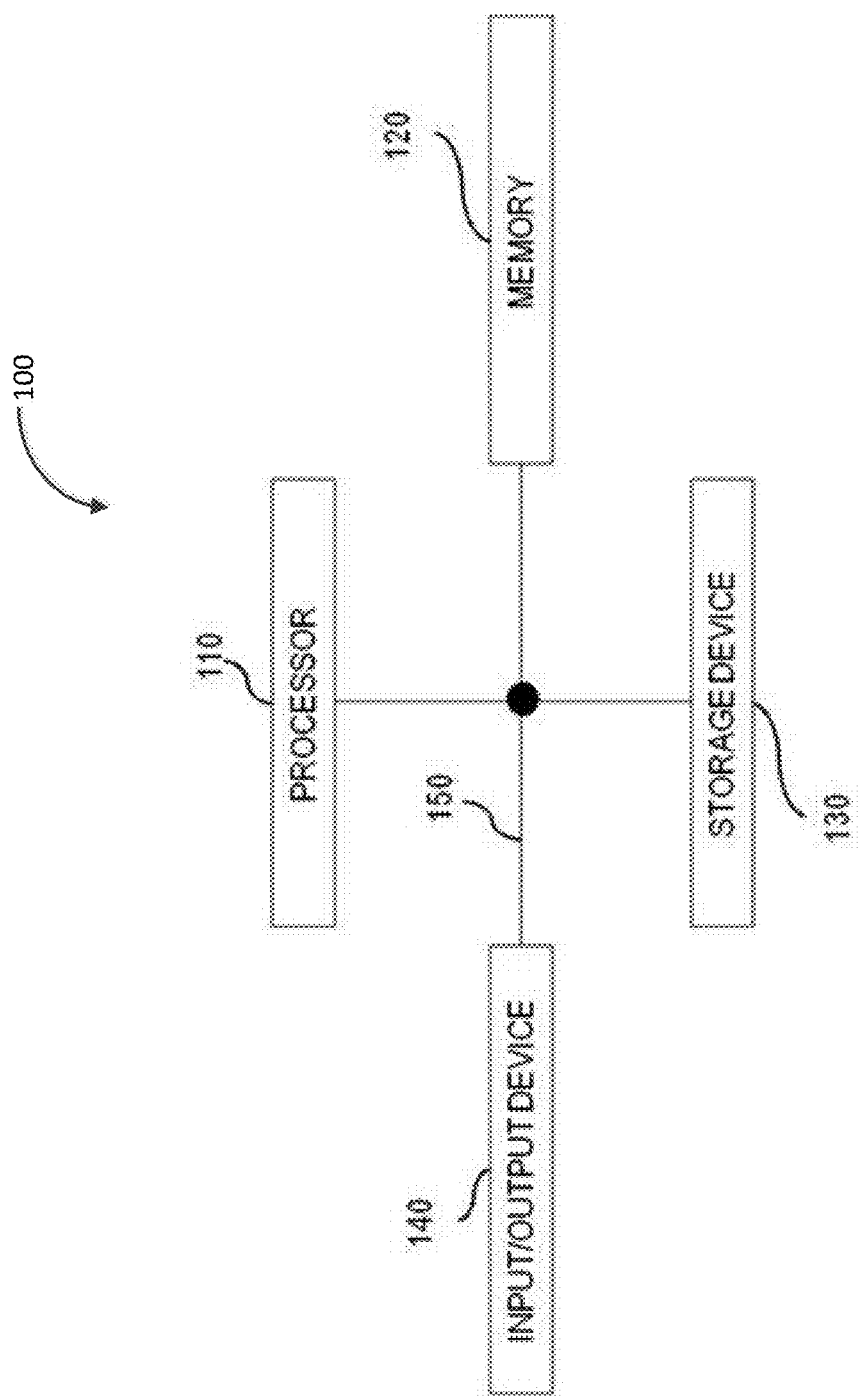
FIG. 1 illustrates an exemplary system for executing a database management system according to some implementations of the current subject matter.

In some implementations, the current subject matter can be configured to be implemented in a system 100, as shown in FIG. 1. The system 100 can include a processor 110, a memory 120, a storage device 130, and an input/output device 140. Each of the components 110, 120, 130 and 140 can be interconnected using a system bus 150. The processor 110 can be configured to process instructions for execution within the system 100. In some implementations, the processor 110 can be a single-threaded processor. In alternate implementations, the processor 110 can be a multi-threaded processor. The processor 110 can be further configured to process instructions stored in the memory 120 or on the storage device 130, including receiving or sending information through the input/output device 140. The memory 120 can store information within the system 100. In some implementations, the memory 120 can be a computer-readable medium. In alternate implementations, the memory 120 can be a volatile memory unit. In yet some implementations, the memory 120 can be a non-volatile memory unit. The storage device 130 can be capable of providing mass storage for the system 100. In some implementations, the storage device 130 can be a computer-readable medium. In alternate implementations, the storage device 130 can be a floppy disk device, a hard disk device, an optical disk device, a tape device, non-volatile solid state memory, or any other type of storage device. The input/output device 140 can be configured to provide input/output operations for the system 100. In some implementations, the input/output device 140 can include a keyboard and/or pointing device. In alternate implementations, the input/output device 140 can include a display unit for displaying graphical user interfaces.

Figure 2:
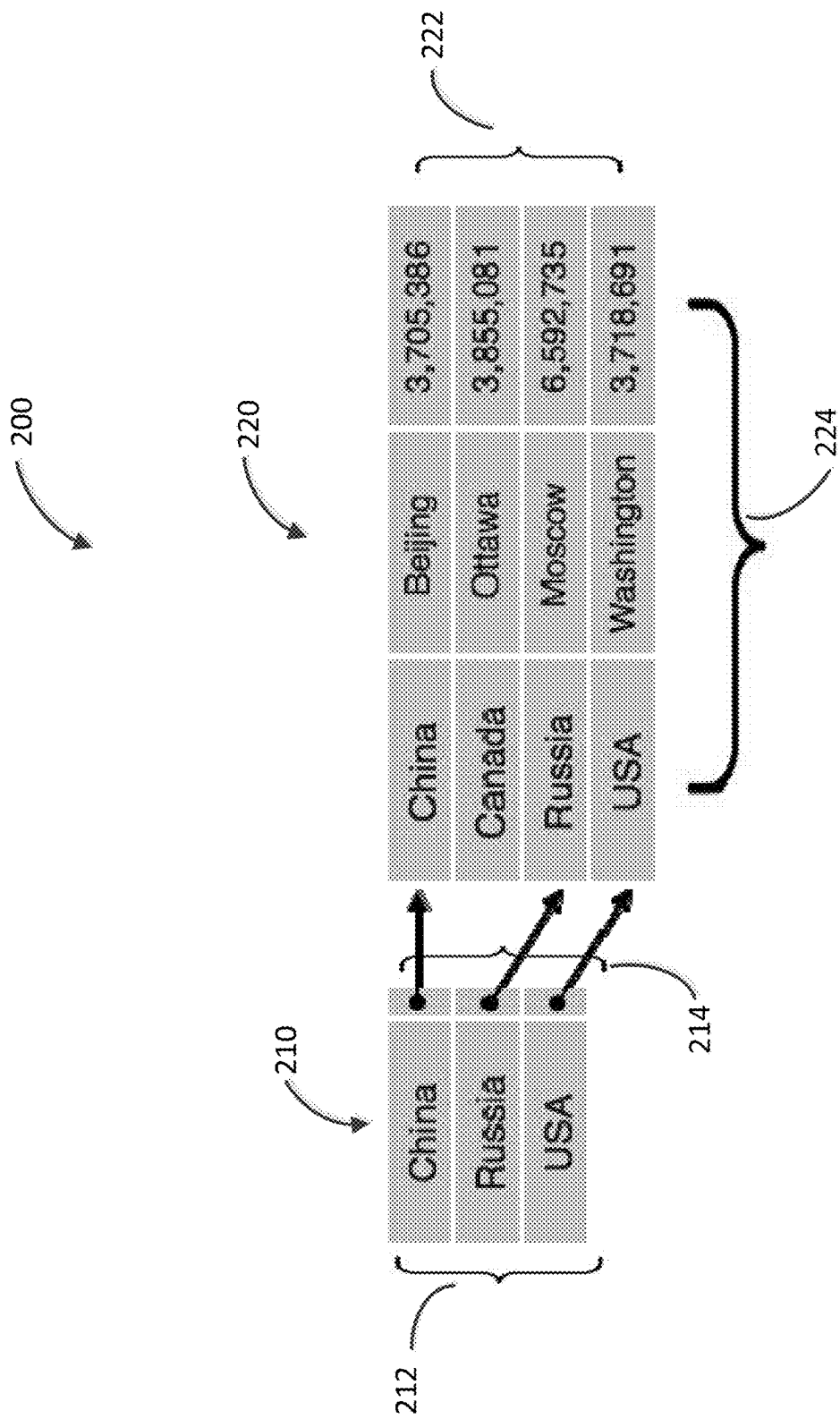
FIG. 2 illustrates an embodiment of a relational database system.

FIG. 2 illustrates an embodiment of a relational database management system 200. The DBMS 200 includes a data index 210, and a relational table 220. Rows 222 of the table 220 represent countries, and the columns 224 represent data (e.g., name of the capital, total area) associated with the countries. The data index 210 includes an index file 212 and a key file 214. An index value in the index file 212 is related to a key in the key file 214. The index value can be representative (e.g., a copy) of a value in the relational table 220. The key related to the index value can refer to the value in the relational table 220. For example, the key can include the memory address of the value. In FIG. 2, an index value in the index file 212 is a copy of a country name in the first column of the table 220. The key associated with the index value refers to the country name in the column 220. If the system 200 receives a user query based on a country name (e.g., China), the system 200 may search for the country name in the index file 212. If there is a match, the key associated with the matched index value can refer to the appropriate value in the first column of the table 220.

Figure 3A:
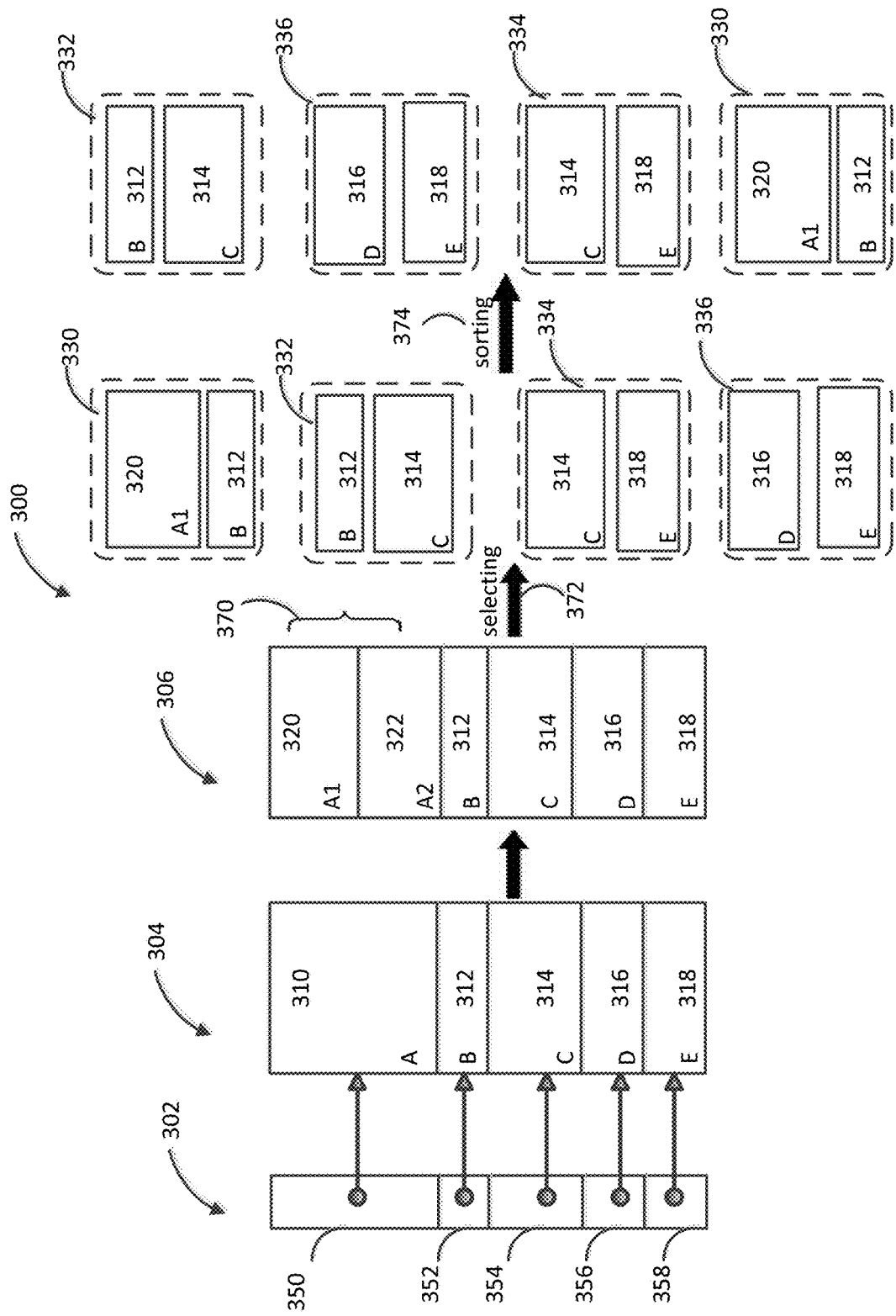
FIGS. 3A and 3B illustrate an embodiment of a method of merging one or more data blocks in a column of a relational table.
Figure 3B:
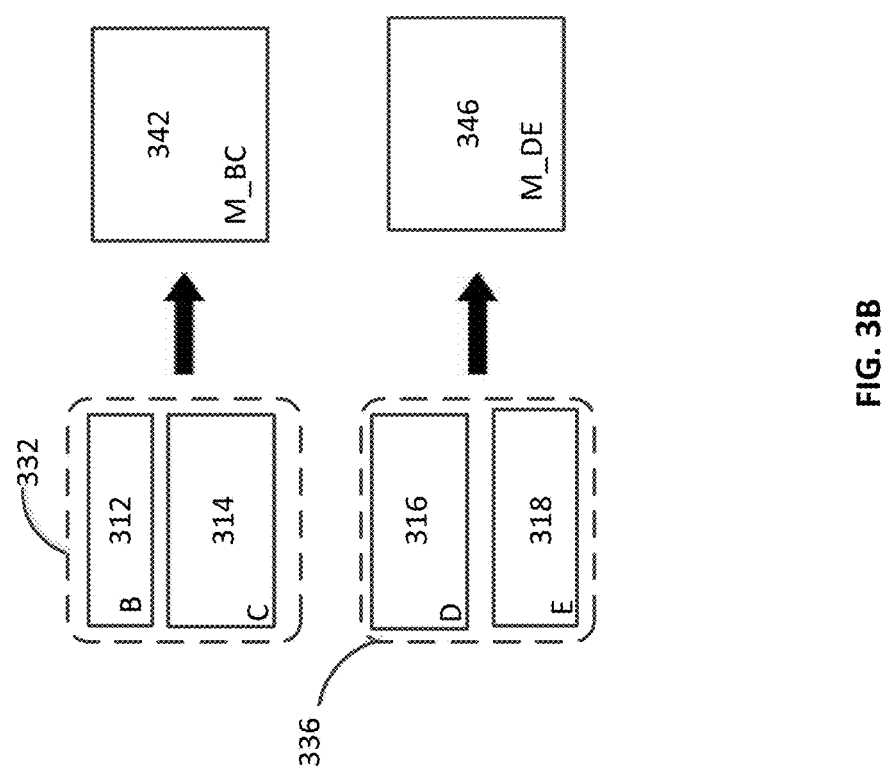

FIGS. 3A and 3B describe an embodiment of a method 300 of merging one or more data blocks (e.g., 310-318) in a column 304 of a relational table. Merging data blocks can improve the performance of a constant-space index 302. The size of the constant-space index 302 does not change when new data blocks are added to the column. The size of the index 302 can be defined when the column 304 is created, and can be related to the size of the column 304. The size can depend on the relevance of the column 304. For example, if the DBMS associated with the relational table receives a high volume of queries for values in the column 304, the size of the index 302 (index size) can be large (e.g., index 302 can be a dense-index and every value in the column 304 is indexed). The index size can also depend on the property of the hardware (e.g., memory size) supporting the DBMS, properties of the DBMS (e.g., distribution of the DBMS over various nodes), properties of the stored data (e.g., query type associated with the data) etc.

The column 304 contains multiple data blocks (310-318). Each data block is indexed by a sub-index (e.g., 350-358) of the index 302. For example, keys in the sub-index 350 refer to values stored in the data block 310. It should be noted that although the size of the constant-index data file 302 is fixed, the sizes of sub-indices 350-358 may vary. The sizes of a sub-index can depend on, for example, the size of the associate data block.

Cardinality of a data block is defined as the number of distinct values in the data block. For example, cardinality of a first data block including the values $\{1, 2, 2, 4, 7, 9, 9\}$, is 5. Similarly, cardinality of a second data block including the values $\{1, 5, 7, 7, 12, 15, 17\}$ is 6. Combined cardinality is defined as the number of distinct values in a data block pair. For example, the combined cardinality of a data block pair including the first data block and the second data block is 9. The combined cardinality is representative of the distinct values in the data block pair. Cardinality of a dataset can be calculated by using cardinality algorithms, for example, HyperLogLog. The cardinality algorithms may estimate the cardinality (estimated cardinality) of a data block (or a data block pair) rather than calculating the exact cardinality thereof. In this application, "cardinality" can refer to either the exact cardinality or the estimated cardinality.

In one embodiment, the decision to merge a data block pair can be based on a cardinality difference of the data block pair. The cardinality difference can be calculated by subtracting the larger cardinality value of the data blocks in the data block pair from the combined cardinality of the data block pair. For example, the cardinality of the first data block is 5; the cardinality of the second data block is 6; and the combined cardinality is 9. Therefore, the cardinality difference of the data block pair including the first and second data blocks is 3 (9−max (5, 6)). A small cardinality difference value can indicate that the corresponding data block pair may be a good candidate for the formation of a merged data block. A large cardinality difference value can indicate that the corresponding data block pair may be a bad candidate for the formation of a merged data block.

In one embodiment, the DBMS may limit the maximum size of data blocks in a column of a relational table to a threshold size. A data block larger than the threshold size can be divided into multiple data blocks. In a preparation phase, size of the data blocks 310-318 is calculated. If a data block is found to be larger than the threshold size, it is divided into two or more parts. For example, data block 310 is larger than the threshold size, and is therefore divided into two data blocks 320 and 322.

After the preparation phase, the "prepared" column 306 includes data blocks 320, 322, 312, 314, 316 and 318. The preparation phase can be followed by the calculation phase in which cardinality differences for various data block pair in the column 306 is calculated. The calculation phase is followed by a merging phase. In the merging phase, desirable data block pairs are selected and merged. The first part of the selection process 372 involves selecting data block pairs from the column 306. For example, a sliding window 370 can slide along the column 306 and select pairs of adjacent data blocks. For example, data block pairs {320, 322}, {322, 312}, {312, 314}, {314, 316}, and {316, 318} can be selected. Additionally or alternatively, data block pairs from the column 306 can be randomly selected, and/or selected according to a predetermined algorithm. The cardinality difference is calculated for the selected data block pairs.

The next step of the selection process 372 is determining the data block pairs with a cardinality difference smaller than a threshold cardinality value. For example, in FIG. 3A, data block pairs 330 (including data blocks 320 and 312), data block pair 332 (including data blocks 312 and 314), data block pair 334 (including data blocks 314 and 318), and data block pair 336 (including data blocks 316 and 318) have a cardinality difference less than the threshold cardinality value. The aforementioned data block pairs can be sorted 374 based on the value of their cardinality difference. For example, data block pairs can be sorted in an ascending order of their cardinality difference values. A data block pair with small cardinality difference may be given preference for the formation of a merged data block over a data block pair with a larger cardinality difference. In FIG. 3A, data block pair 332 has the smallest cardinality difference, and the data block pair 330 has the largest cardinality difference. The data blocks pairs are merged starting with the data block pair with the smallest cardinality difference (data block pair 332).

A data block cannot be used in the formation of more than one merged data block. In other words, if a data block is part of more than one data block pair, it can be merged into a merged data block only with one of the data blocks with which it is paired. For example, data block 312 is a part of the data block pair 332 which can be the first data block pair to be merged (as it has the smallest cardinality difference). Data block 312 is also a part of the data block pair 330. However, data block pair 330 cannot be merged in this example because one of its components (namely data block 312) has already been used in the formation of a merged data block. Similarly, data block 318 is a part of data block pair 336 and data block pair 334. Because data block pair 336 is merged first (as it has smaller cardinal difference than data block 334), data block pair 334 is not merged to form a merged data block.

FIG. 3B illustrates two data block pairs 332 and 336 that are viable candidates for the formation of merged data blocks. Data blocks 312 and 314 can be merged to form a merged data block 342. Data blocks 316 and 318 can be merged to form a merged data block 346. Data blocks that have been merged to form a merged data block are replaced by the merged data block in the relational table, and saved in a tracking data structure. Before merging a subsequent data block pair, the database management system can check that the data blocks in the data block pair are not present in the tracking data structure. In other words, the database management system can check whether the data blocks in the data block pair have not already been used to generate a merged data block. If not, the data blocks in the data block pair are available for merging to form a merged data block.

In one embodiment, the size of the merged data blocks is calculated. If the size of a merged data block is larger than a threshold size, the merged data block is discarded. The threshold size can be related to the threshold size used in the preparation phase described above (e.g., the two threshold sizes can be the same). For example, if the size of the merged data block 346 is larger than the threshold size, it can be discarded. Alternately, the database management system can calculate the size of the merged data block without merging the data blocks. If the calculated size exceeds the threshold size, the merged data block may not be calculated.

The steps described in FIGS. 3A and 3B may be repeated multiple times. For example, the steps may be repeated until no suitable data block pair is available for the formation of a merged data block. For example, if no data block pair has a cardinality difference lower than the threshold cardinality value, no suitable data block pair would be available.

Figure 4:
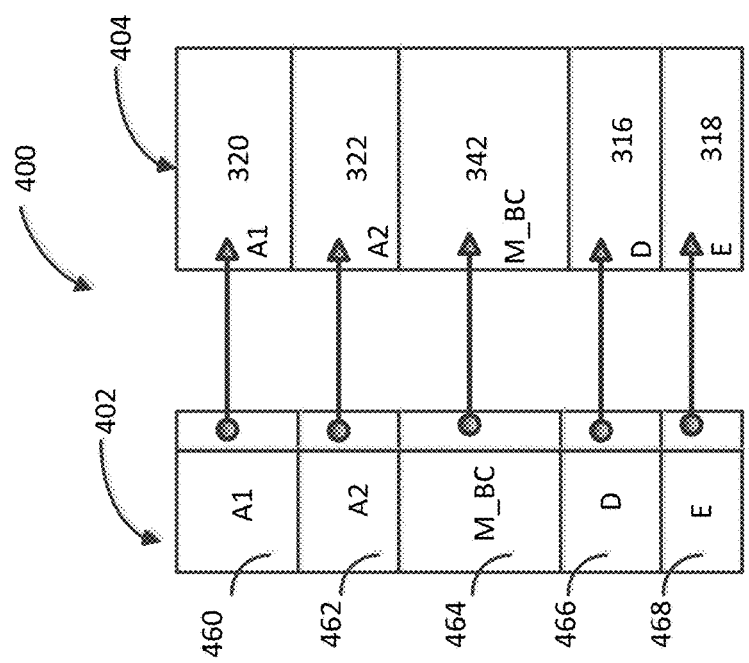
FIG. 4 illustrates a modified column comprising merged data block and the corresponding constant-index data file.

FIG. 4 illustrates a modified column 404 and the modified constant-index data file 402. In the modified column 404, the merged data block 342 replaces the data blocks 312 and 314. It should be noted that data blocks 316 and 318 have not been replaced by the modified data block 346 because its size is greater than the threshold size. The size of the constant-index data file 402 is the same as that of the constant-index data file 302. However, the size of sub-indices in the constant-index data file 402 can be different from that of sub-indices in constant-index data file 302. The size of a sub-index can depend on the ratio of the cardinality of the data block to which it refers, and the sum of cardinalities of all the data blocks in the column 404. For example, the size of the sub-index 364 can be larger than that of sub-index 366 if the cardinality of data block 342 is larger than that of the data block 316.

Figure 5:
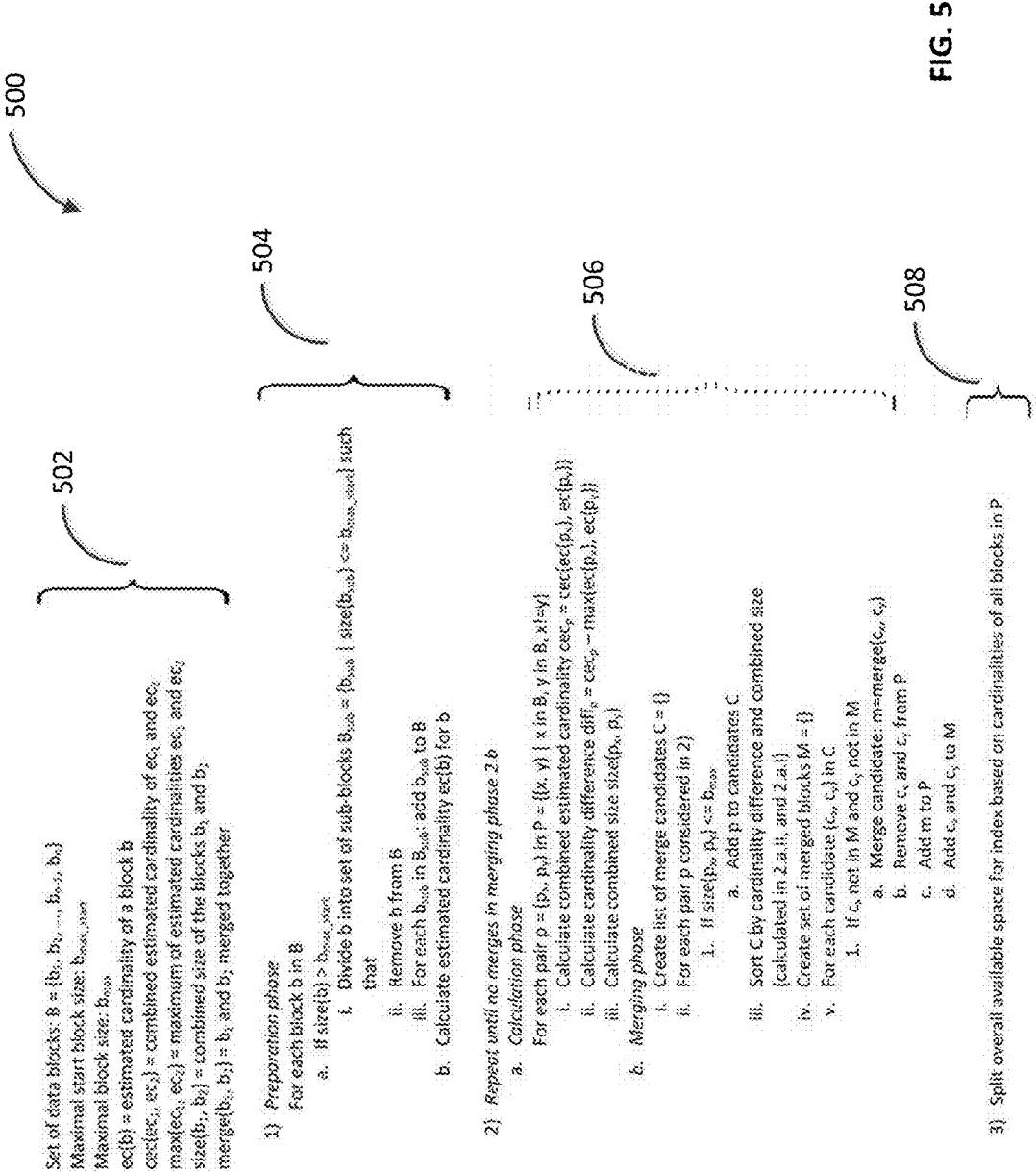
FIG. 5 illustrates an exemplary algorithm for merging data blocks in a column of a relational database.

FIG. 5 illustrates exemplary pseudocode illustrating features of a process for merging data blocks in a column of a relational database. The index 502 provides the definition of various variables, symbols and functions used in the algorithm.

In the preparation phase 504, the algorithm 500 (which can be executed by the database management system) searches for data blocks ($b_1, b_2 \ldots b_n$) in a data structure B (e.g., a column of a relational table) whose size is larger than a threshold size ($b_{max\_start}$). If a data block (b) fulfils the aforementioned condition, it is divided into one or more data blocks ($b_{sub}$) that are smaller than the threshold size. Additionally, the data block b is replaced in the data structure by the data blocks ($b_{sub}$). For example, as described in FIG. 3A, data block 310 can be divided into two data blocks 320 and 322. The algorithm 500 also calculates the cardinality of each data block in the data structure.

In the selection phase 506, data block pairs are selected from the data structure B. For each data block pair, a combined cardinality ($cec_p$) and a cardinality difference ($diff_p$) can be calculated. Additionally, the combined size of the data block pair can be calculated (size ($p_x, p_y$)). Based on the value of the cardinality difference, "merge candidates" can be selected. For example, in FIG. 3A, data block pairs 330, 332, 334 and 336 are selected based on their cardinality difference. Additionally, the algorithm requires that the size of a data block obtained by merging the merge candidates is less than a threshold size ($b_{max}$). The merge candidates are sorted based on cardinality difference and combined size. In one embodiment, if two merge candidates have the same cardinality difference, the merge candidate with the smaller combined size can be considered as a better candidate for the formation of merged data block. After the merged candidates have been sorted (e.g., in the order with increasing cardinal difference value), they are merged to form merged data blocks and added to the data structure P. Data blocks that have been used to form a merged block are added to a tracking data structure (M). After all the merged data blocks have been calculated, the constant-space index is split 508 into multiple sub-indices based on the cardinality of the data blocks.

FIG. 6 is a process flow diagram 600 illustrating features that can be included in an exemplary technique for merging data blocks in a column of a relational database. At 602, cardinality differences and combined sizes are calculated for one or more data block pairs in a relational database. At 604, a data block pair is selected from the one or more data block pairs based on a calculated cardinality difference and a calculated combined size that are associated with the selected data block pair. After the data block pair has been selected, the selected data block pair is merged at 606 to form a merged data block. The merged data block replaces the selected data block pair in the relational database at 608.

Aspects of the subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. A client and server are generally, but not exclusively, remote from each other and typically interact through a communication network, although the components of the system can be interconnected by any form or medium of digital data communication. Examples of communication networks include, but are not limited to, a local area network ("LAN"), a wide area network ("WAN"), and the Internet. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A computer program product comprising a machine-readable medium storing instructions that, when executed by at least one programmable processor, cause the at least one programmable processor to perform operations comprising:

calculating cardinality differences and combined sizes for one or more data block pairs in a column of a relational database;

selecting a data block pair from the one or more data block pairs based on a calculated cardinality difference and a calculated combined size associated with the selected data block pair;

merging the selected data block pair to form a merged data block; and modifying the column in the relational database, the modifying including replacing the selected data block pair with the merged data block.

2. The computer program product of claim 1, wherein the one or more data block pairs are in a column of the relational database.

3. The computer program product of claim 2, wherein the data block pair is selected by a sliding window, the sliding window selects adjacent data blocks in the column of the database.

4. The computer program product of claim 1, wherein the cardinality difference for a first data block pair from the one or more data block pairs is calculated by at least:

calculating a combined cardinality for the first data block pair;

calculating a first cardinality for a first data block in the first data block pair and a second cardinality for a second data block in the first data block pair; and subtracting a larger of the first cardinality and the second cardinality from the combined cardinality.

5. The computer program product of claim 1, wherein the data block pair is selected when the calculated cardinality difference parameter associated with the data block pair is below a threshold value.

6. The computer program product of claim 1, comprising a data index, the data index comprising a sub-index assigned to the merged data block.

7. The computer program product of claim 6, wherein a size of the sub-index is related to a cardinality of the merged data block.

8. A system comprising:
at least one programmable processor; and
at least one machine-readable medium storing instructions that, when executed by the at least one programmable processor, cause the at least one programmable processor to perform operations comprising:
calculating cardinality differences and combined sizes for one or more data block pairs in a column of a relational database;
selecting a data block pair from the one or more data block pairs based on a calculated cardinality difference and a calculated combined size associated with the selected data block pair;
merging the selected data block pair to form a merged data block; and
modifying the column in the relational database, the modifying including replacing the selected data block pair with the merged data block.

9. The system of claim 8, wherein the one or more data block pairs are in a column of the relational database.

10. The system of claim 9, wherein the data block pair is selected by a sliding window, the sliding window selects adjacent data blocks in the column of the database.

11. The system of claim 8, wherein the cardinality difference for a first data block pair from the one or more data block pairs is calculated by at least:
calculating a combined cardinality for the first data block pair;
calculating a first cardinality for a first data block in the first data block pair and a second cardinality for a second data block in the first data block pair; and
subtracting a larger of the first cardinality and the second cardinality from the combined cardinality.

12. The system of claim 8, wherein the data block pair is selected when the calculated cardinality difference parameter associated with the data block pair is below a threshold value.

13. The system of claim 8, comprising a data index, the data index comprising a sub-index assigned to the merged data block.

14. The system of claim 13, wherein a size of the sub-index is related to a cardinality of the merged data block.

15. A method comprising:
calculating cardinality differences and combined sizes for one or more data block pairs in a column of a relational database;
selecting a data block pair from the one or more data block pairs based on a calculated cardinality difference and a calculated combined size associated with the selected data block pair;
merging the selected data block pair to form a merged data block; and
modifying the column in the relational database, the modifying including replacing the selected data block pair with the merged data block.

16. The method of claim 15, wherein the one or more data block pairs are in a column of the relational database.

17. The method of claim 16, wherein the data block pair is selected by a sliding window, the sliding window selects adjacent data blocks in the column of the database.

18. The method of claim 15, wherein the cardinality difference for a first data block pair from the one or more data block pairs is calculated by at least:
calculating a combined cardinality for the first data block pair;
calculating a first cardinality for a first data block in the first data block pair and a second cardinality value for a second data block in the first data block pair; and
subtracting a larger of the first cardinality value and the second cardinality value from the combined cardinality.

19. The method of claim 15, wherein the data block pair is selected when the calculated cardinality difference parameter associated with the data block pair is below a threshold value.

20. The method of claim 15, comprising a data index, the data index comprising a sub-index assigned to the merged data block.

21. The method of claim 20, wherein a size of the sub-index is related to a cardinality of the merged data block.

* * * * *